(12) United States Patent
Gasbarro

(10) Patent No.: US 8,419,511 B1
(45) Date of Patent: Apr. 16, 2013

(54) CHICKEN MID-WING SPLITTER

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days.

(21) Appl. No.: 13/397,721

(22) Filed: Feb. 16, 2012

(51) Int. Cl.
*A22C 21/00* (2006.01)

(52) U.S. Cl.
USPC ......................................................... 452/169

(58) Field of Classification Search ................. 452/149, 452/166, 169, 170, 151, 150, 155
See application file for complete search history.

(56) References Cited

U.S. PATENT DOCUMENTS

| | | | |
|---|---|---|---|
| 4,207,653 A * | 6/1980 | Gasbarro | 452/169 |
| 4,306,335 A * | 12/1981 | Hawk et al. | 452/169 |
| 4,472,858 A | 9/1984 | Keith | |
| 4,769,872 A | 9/1988 | Hazenbroek et al. | |
| 5,176,564 A * | 1/1993 | Hazenbroek | 452/169 |
| 5,462,478 A | 10/1995 | Fredsby et al. | |
| 5,490,812 A * | 2/1996 | Schaarschmidt | 452/138 |
| 5,496,210 A * | 3/1996 | Davis | 452/169 |
| 5,569,069 A * | 10/1996 | Horst et al. | 452/169 |
| 5,618,230 A * | 4/1997 | Bargele et al. | 452/169 |
| 6,120,369 A | 9/2000 | Eide | |
| 6,656,032 B2 | 12/2003 | Hazenbrock et al. | |
| 7,056,202 B2 | 6/2006 | Pein | |
| 7,204,748 B2 | 4/2007 | Gasbarro | |
| 7,341,505 B1 * | 3/2008 | Gasbarro | 452/169 |
| 7,374,478 B2 | 5/2008 | Gasbarro | |
| 7,674,162 B1 | 3/2010 | Gasbarro | |

* cited by examiner

*Primary Examiner* — Richard Price, Jr.
(74) *Attorney, Agent, or Firm* — Jason H. Foster; Kremblas & Foster

(57) ABSTRACT

An apparatus for splitting poultry mid-wings into separate radius and ulna portions. The apparatus includes a plurality of carrier blocks mounted to a drive chain that drives the carrier blocks along a path in a continuous loop around the apparatus. Each carrier block has recesses formed in it that cooperate with recesses formed in adjacent carrier blocks to form carrier slots that hold mid-wings in a predetermined orientation. A blade member having an upper blade and a lower blade extends into the path and is aligned with blade channels formed in the carrier blocks. The blade member bisects mid-wings that are held in the carrier slots as they move downstream. The carrier blocks rotate downwardly about the downstream end of the path and are separated from one another, thereby opening the carrier slots. The separated mid-wings contained in the slots are thereby allowed to fall out of the slots.

10 Claims, 6 Drawing Sheets

CHICKEN MID-WING SPLITTER

BACKGROUND OF THE INVENTION

This invention relates generally to a poultry processing apparatus and more particularly to an apparatus for automatically separating the radius and ulna portions of a poultry mid-wing from one another.

To meet the demands of large scale poultry consumption throughout the world, numerous machines have been developed over the past several decades to enhance various aspects of poultry processing. Particular attention has been directed to improving the efficiency with which various cuts of poultry meat can be produced. While such machines have proven to be highly effective for producing various different cuts of poultry, some poultry parts contain small, tightly spaced bones that require complex manual manipulation to be separated into smaller cuts. For example, the mid-wing section of a poultry wing, which is located intermediate the larger, more muscular drumette section and the smaller, less muscular wingtip section, contains two generally parallel bones (i.e., the radius and the ulna bones) that are joined together at their ends by ligaments.

Although mid-wing sections of poultry wings are typically cooked and consumed as unitary pieces of food in the United States, it is common practice in some parts of the world to separate the radius bone and its surrounding muscle, tissue, and skin (herein referred to as the "radius portion") from the ulna bone and its surrounding muscle, tissue, and skin (herein referred to as the "ulna portion") to produce two separate, smaller cuts of meat. These cuts are generally easier to consume than a whole mid-wing in that they do not require a consumer to manually rend, or eat between, the radius and ulna bones. This method of preparing mid-wing sections of poultry has been gaining popularity in light of recent advances in agronomy that have allowed the farming of larger, more muscular poultry. Such poultry have large mid-wing sections that can be difficult to rend manually or otherwise consume as a single piece.

Traditionally, the radius and ulna portions of poultry mid-wing sections have been separated by manual cutting, which is time-consuming, labor-intensive, and somewhat dangerous. The inconsistent nature of manual cutting can also result in the accidental cutting or nicking of the radius and ulna bones themselves, which can create shards of bone that make the cuts undesirable. Therefore, the need exists for a means of separating the radius and ulna portions of poultry mid-wing sections safely, efficiently, and without forming shards.

BRIEF SUMMARY OF THE INVENTION

In accordance with the present invention, there is provided an apparatus for splitting poultry mid-wings into separate radius and ulna portions. The apparatus includes a support frame and plurality of abutting mid-wing carrier blocks that are mounted to a drive chain that forms a continuous loop around the frame and is driven by a motor. The mid-wing carrier blocks are thus driven in the manner of a conveyor belt around the apparatus, with the carrier blocks being driven in a downstream direction along a path on the upper expanse of the apparatus.

Each of the carrier blocks has a pair of vertically-elongated, laterally-spaced, scooped recesses formed in its front face and a pair of similar recesses formed in its rear face. Vertically-elongated blade channels laterally bisect each of the recesses and form narrow passages that extend between the front and rear sides of the carrier block. The blocks abut one another and the scooped recesses of adjacent pairs of blocks cooperate to form a plurality of mid-wing carrier slots arranged in two longitudinally-extending rows along the path of the apparatus. Each carrier slot is of a size and shape that is only large enough to accommodate a largest anticipated poultry mid-wing. A mid-wing can thus be securely held in a carrier slot in a desired orientation.

The apparatus further includes a splitting module that is preferably removably mounted to the support frame above the carrier blocks at the downstream end of the apparatus. The splitting module includes a pair of blade members, preferably formed of stainless steel, that are removably mounted to a blade holder. The blade members extend downwardly from the blade holder in a laterally-spaced, parallel relationship and are separated by a distance that is substantially equal to the on-center lateral distance between the blade channels in the carrier blocks. The blade members extend into and between the blade channels of carrier blocks. Each of the blade members includes a preferably triangular upper blade and a preferably triangular lower blade that are separated by a first crotch. The upper blade is wider and extends several inches further upstream than the lower blade and terminates in a piercing tip. A top edge of the upper blade meets the blade holder at a juncture that forms a second crotch.

The blade members preferably include mounting plates that extend upwardly through rectangular apertures in the blade holder. Removable fasteners extend laterally through the mounting plates and through mounting arms that extend upwardly from the blade holder, thereby removably securing the blade members to the blade holder. There is preferably a plurality of vertically spaced apertures formed in the mounting plates for allowing the blade members to be secured in a variety of vertical positions relative to the blade holder.

During typical operation of the apparatus, one or more human operators insert whole poultry mid-wings into the carrier slots as the carrier blocks move in the downstream direction. The mid-wings are inserted longitudinally into the carrier slots, with the radius portion of a mid-wing positioned substantially in one lateral half of a carrier slot and the ulna portion of the mid-wing positioned substantially in the opposing lateral half of the slot.

The slotted mid-wings are moved in the downstream direction by the drive chain and, when a mid-wing reaches a blade member, the piercing tip of the upper blade of the blade member pierces the mid-wing at a point laterally intermediate the radius and ulna bones of the mid-wing. As a mid-wing is forced further downstream the upper blade severs the soft tissue of the mid-wing longitudinally outwardly from the point of entry of the piercing tip toward the opposing wingtip and drumette ends of the mid-wing.

After the mid-wing has been forced over the first several inches of the upper blade, the connective tissue at the crux of the upper end of the mid-wing is forced into the crotch between the top edge of the upper blade and the blade holder. The upper end of the mid-wing is then forcibly severed as the carrier blocks continue to drive the mid-wing downstream.

As the mid-wing continues to be moved further downstream over the blade member, the connective tissue at the crux of the lower end of the mid-wing is forced into the crotch between the bottom edge of the upper blade and the top edge of the lower blade. The lower end of the mid-wing is then forcibly severed as the carrier blocks continue to drive the mid-wing downstream.

After or immediately before the radius and ulna portions of the mid-wings have been completely severed from one another, the carrier blocks that form the carrier slots that hold the separated mid-wings are rotated downwardly about the downstream end of the apparatus. As the carrier blocks rotate downwardly, the blocks are separated from one another, and the carrier slots are opened. The separated radius and ulna portions of the mid-wings are thereby allowed to fall by gravity into a collection bin.

Figure 1:
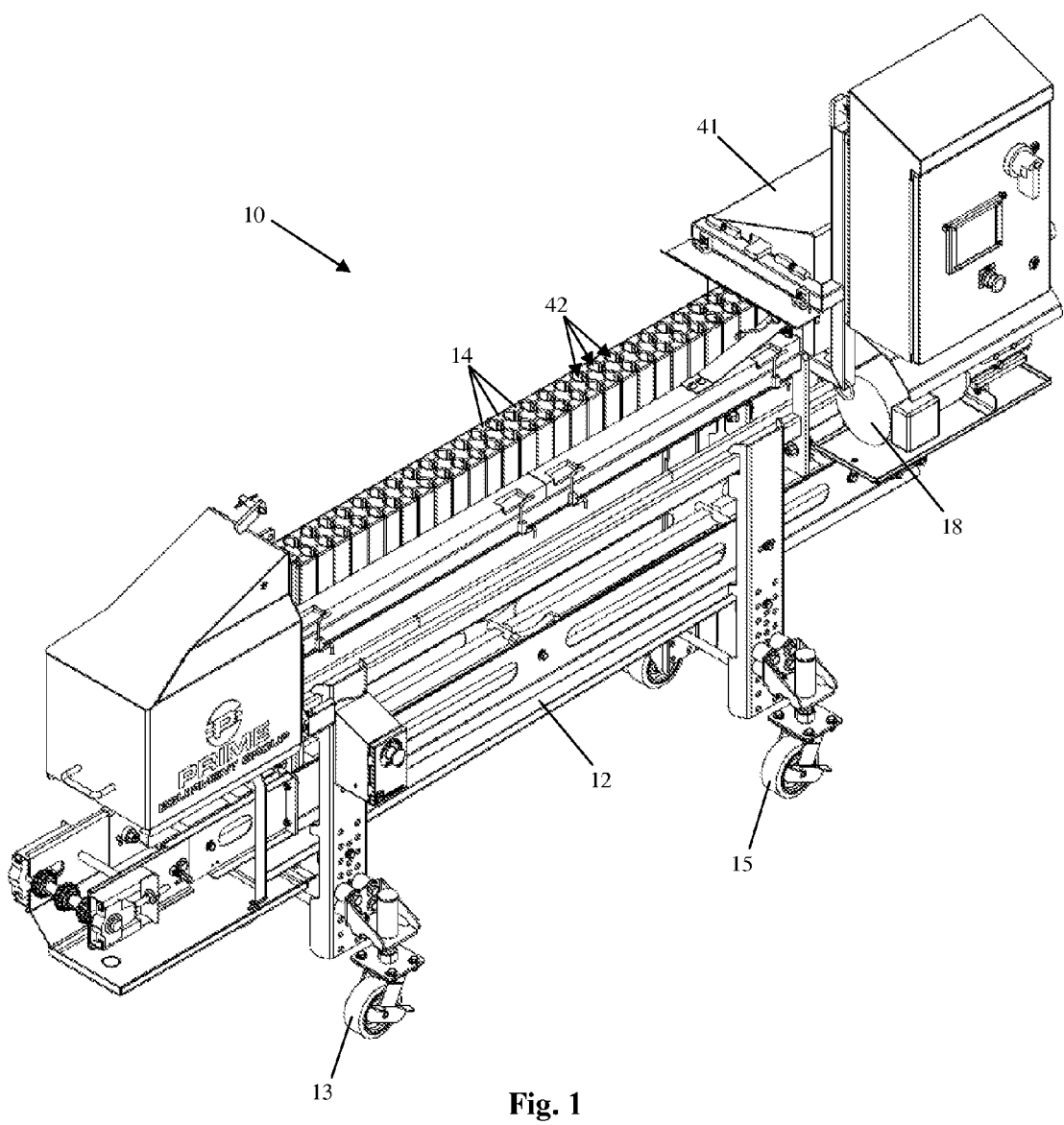
FIG. 1 is a perspective illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

An apparatus for splitting the mid-wing sections of poultry wings into separate radius and ulna portions in accordance with the present invention is indicated generally at 10 in FIG. 1. The apparatus 10 generally includes a support frame 12, a plurality of mid-wing carrier blocks 14, a splitting module 16 (see FIGS. 3 and 4), and a motor 18.

For the sake of convenience and clarity, terms such as "top," "bottom," "up," "down," "inward," "outward," "vertical," "horizontal," "upstream," "downstream," "lateral," and "longitudinal" will be used herein to describe the relative placement and orientation of various components of the apparatus 10, all with respect to the geometry and orientation of the apparatus 10 as it appears in FIG. 1. The length of the apparatus is along a horizontal line that extends from the left end of the apparatus to the right end of the apparatus, and the term "upstream" refers to a longitudinal position nearer the left end of the apparatus while the term "downstream" refers to a longitudinal position nearer the right end of the apparatus. Said terminology will include the words specifically mentioned, derivatives thereof, and words of similar import.

Referring to FIG. 1, the support frame 12 is formed of numerous horizontal and vertical frame members, such as steel tubing sections, that are rigidly joined together to provide suitable support for the other components of the apparatus 10. The support frame 12 is preferably provided with locking casters 13 and 15 for allowing the apparatus 10 to be easily moved to, and secured at, a desired location within a plant or other operating environment.

Figure 5:
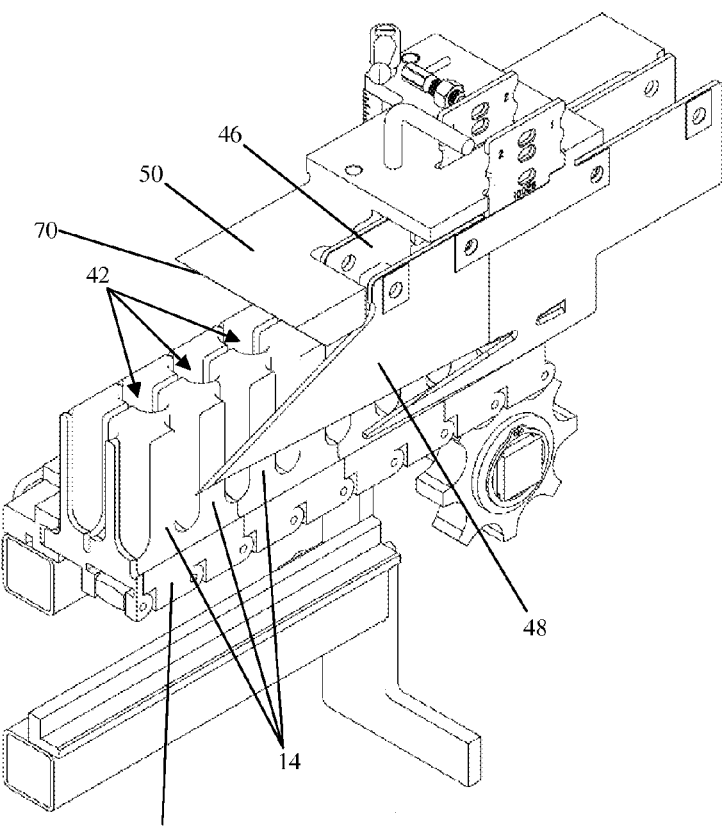
FIG. 5 is a detail perspective view in-section illustrating the splitting module and carrier blocks of the preferred embodiment of the present invention shown in FIG. 1.
Figure 6:
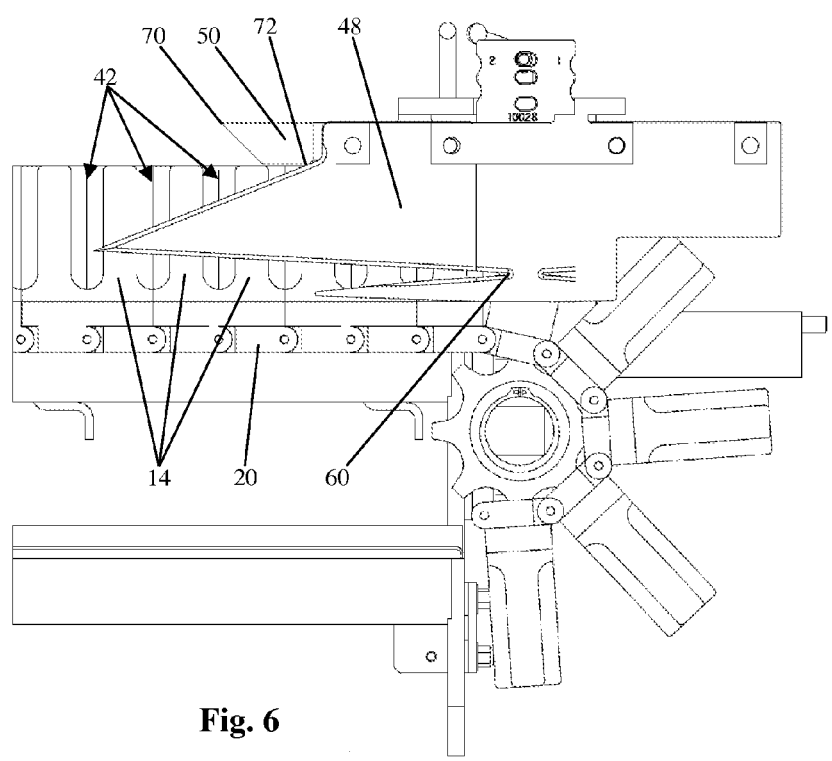
FIG. 6 is a detail side view in-section illustrating the splitting module and carrier blocks of the preferred embodiment of the present invention shown in FIG. 1.

Referring to FIGS. 1, 5, and 6, the mid-wing carrier blocks 14 are mounted at their bases to a chain 20 (as described in greater detail below) that forms a continuous loop around the frame and is driven by a gear (not within view) on the motor 18. The motor 18 is preferably an electric motor, such as a servo motor, but could be substituted by a hydraulic or pneumatic motor or any other prime mover as will be understood by the person having ordinary skill in the art. The motor 18 could also, for example, have a gear reduction or a frequency drive to allow the speed that it is driven to be adjusted.

The mid-wing carrier blocks 14 are thus driven in the manner of a conveyor belt around the apparatus 10. During normal operation of the apparatus 10, the mid-wing carrier blocks 14 carry poultry mid-wings (in a manner that will be described in greater detail below) through a "path" of the apparatus 10. The mid-wing carrier blocks 14 on the upper span of the chain 20 preferably move in one direction, from an "upstream" end of the apparatus 10 toward a "downstream" end of the apparatus 10, as indicated by the arrows in FIGS. 9 and 10. Of course, if a wing is stuck or the movement of the mid-wing carrier blocks 14 otherwise needs to be reversed, the chain 20 can be driven backward. During normal operation, once a mid-wing carrier block 14 reaches the downstream end of the path, the carrier block 14 is driven beneath the apparatus 10 (as best shown in FIG. 6) in the manner of a conveyer belt. After this the carrier block 14 travels from the downstream end of the apparatus 10 to the upstream end. The carrier block 14 is then rotated upwardly, back to the top of the apparatus 10 at the upstream end of the path.

Figure 2:
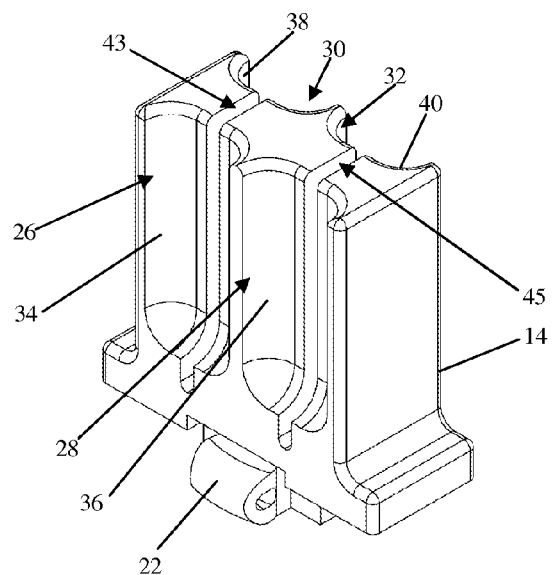
FIG. 2 is a detail perspective view illustrating a mid-wing carrier block of the preferred embodiment of the present invention shown in FIG. 1.

Referring to FIG. 2, one of the mid-wing carrier blocks 14 is shown in detail and is representative of all of the substantially identical mid-wing carrier blocks 14. The mid-wing carrier block 14 is preferably formed of polyoxymethylene (commonly sold under the brand name DELRIN) or other suitably rigid, durable, food-safe material. The block 14 has a front face and a rear face, both of which are planar and parallel to one another in order that each holder can seat against complementary surfaces on adjacent mid-wing carrier blocks 14 when the blocks 14 are aligned parallel to one another, as described in greater detail below. Mounting ears 22 (a second mounting ear is located on the reverse side of the block 14 and is not within view, but is substantially identical to the ear 22) extend from the base of the block 14 and are mounted to the drive chain 20, preferably with removable fasteners. The block 14 can thereby be conveniently removed from the chain 20 for cleaning, repair, or replacement.

The mid-wing carrier block 14 has two pairs of vertically-elongated, laterally-spaced, scooped recesses 26, 28, 30 and 32 formed in its front and rear faces, with each recess 26-32 defined by a concave slot wall 34, 36, 38, and 40, respectively.

The slot walls 34-40 can be entirely contiguous and rounded, as shown in FIG. 2, or can alternatively be angular to form a distinct rear wall, floor, and sidewalls of a respective recess. Vertically-elongated blade channels 43 and 45 laterally bisect each of the slot walls 34-40 and form narrow passages that extend between the front side and rear side of the carrier block 14.

While the carrier blocks 14 of the preferred embodiment of the apparatus 10 have two recesses on their front faces and two recesses on their rear faces, it is contemplated that the carrier blocks 14 can alternatively be made narrower and formed with only one recess in their front and rear faces, or made wider and formed with three or more recesses in their front and rear faces. A fewer number of recesses would allow a fewer number of mid-wings to be simultaneously processed (in the manner described below), and a greater number of recesses would allow a greater number of mid-wings to be simultaneously processed.

With the mid-wing carrier blocks 14 operatively mounted to the chain 20 as shown in FIGS. 1, 5, and 6, the blocks 14 longitudinally abut one another and the scooped recesses of adjacent pairs of blocks 14 cooperate to form a plurality of mid-wing carrier slots 42 arranged in two longitudinally-extending rows along the path of the apparatus 10. Each carrier slot 42 has an open top, a sidewall, and a floor, and is of a size and shape that is only large enough to accommodate a largest anticipated poultry mid-wing with little or no clearance between the walls of each carrier slot 42 and the outer surface of the inserted mid-wing. A mid-wing can thus be securely held in a carrier slot 42 in a desired orientation (described in greater detail below) by the walls defining each slot 42.

Figure 3:
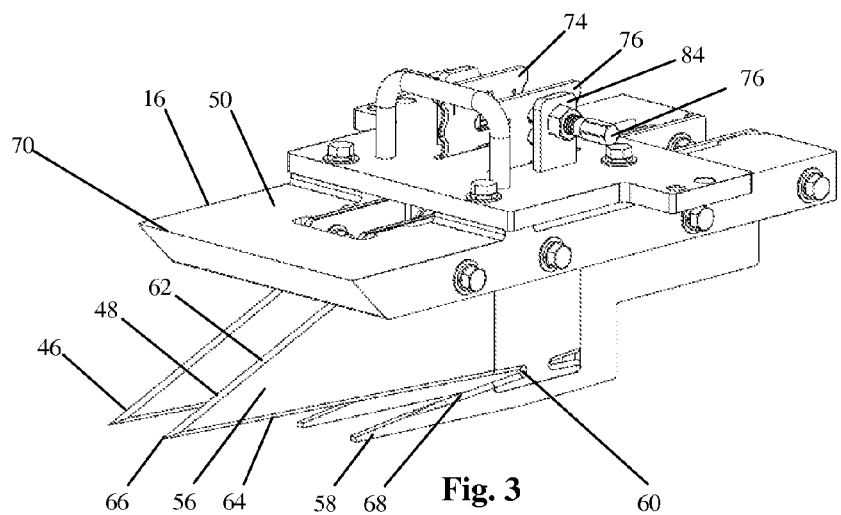
FIG. 3 is a detail perspective view illustrating the splitting module of the preferred embodiment of the present invention shown in FIG. 1.
Figure 4:
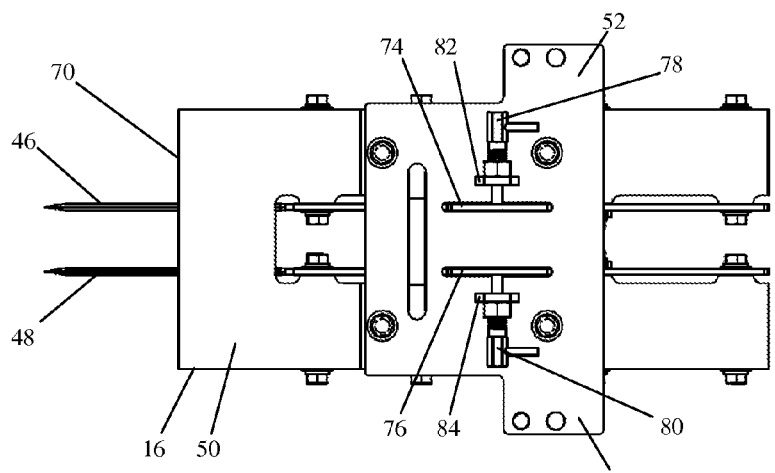
FIG. 4 is a detail top view illustrating the mid-wing carrier block of the preferred embodiment of the present invention shown in FIG. 1.

Referring to FIGS. 3-4, the splitting module 16 (shown covered by the safety shield 41 in FIG. 1) includes a pair of blade members 46 and 48 that are removably mounted to a blade holder 50. The blade members 46 and 48 extend downwardly from the blade holder 50 in a laterally-spaced, parallel relationship and are separated by a distance that is substantially equal to the on-center lateral distance between the blade channels 43 and 45 in the mid-wing carrier blocks 14.

The splitting module 16 is removably mounted to the support frame 12 above the mid-wing carrier blocks 14 near the downstream end of the apparatus 10. Mounting tabs 52 and 54 extend laterally outwardly from the blade holder 50 and are fastened, preferably with conventional removable fasteners, to laterally opposing sidewalls (not within view) of the support frame 12 that flank the path of the apparatus 10.

Referring to FIGS. 5 and 6, the blade members 46 and 48 extend into the aligned blade channels 43 and 45 of the serially connected and aligned carrier blocks 14. The blade members 46 and 48 are preferably formed of stainless steel and are about ¼ inch thick. It is contemplated the blade members 46 and 48 can be made thinner or thicker to suite a particular application. However, it is generally required that the blade members 46 and 48 be thinner than the widths of the blade channels 43 and 45 for allowing the blade members 46 and 48 to pass through the blade channels 43 and 45 without contacting, or substantially frictionally engaging, the mid-wing carrier blocks 14.

Referring again to FIGS. 3-6, each of the blade members 46 and 48 includes a triangular upper blade 56 and a triangular lower blade 58. Only the blade 48 is completely in view, so only the blade 48 is described in more detail below. However, the blade 46 is substantially identical to the blade 48. The upper blade 56 is separated by a crotch 60 from the lower blade 58. The upper blade 56 is wider and extends several inches further upstream than the lower blade 58. The upper blade 56 has a sharpened top edge 62 and a sharpened bottom edge 64 that meet at a tapered, upstream piercing tip 66. The lower blade 58 has a top edge 68 that is partially sharpened adjacent the crotch 60. The sharpened edges 62, 64, and 68 of the upper and lower blades 56 and 58 are preferably sharp enough to sever the connective tissue of a typical poultry mid-wing, but not sharp enough to nick or otherwise damage the bones of a mid-wing upon moderately forceful contact as provided by movement of the drive chain 20. Importantly, the top, downstream edge 70 of the blade holder 50 extends downstream above the sharpened, top edge 62 of the upper blade 56 to form a crotch 72 therebetween (see FIG. 6).

Figure 11:
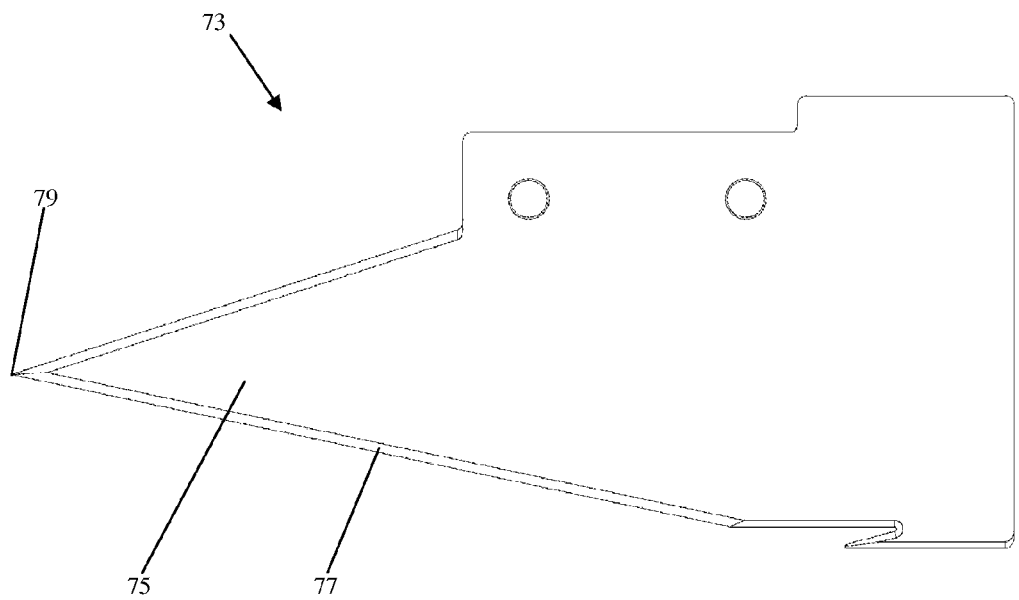
FIG. 11 is a detail side view illustrating an alternative embodiment of a blade member of the present invention.
Figure 12:
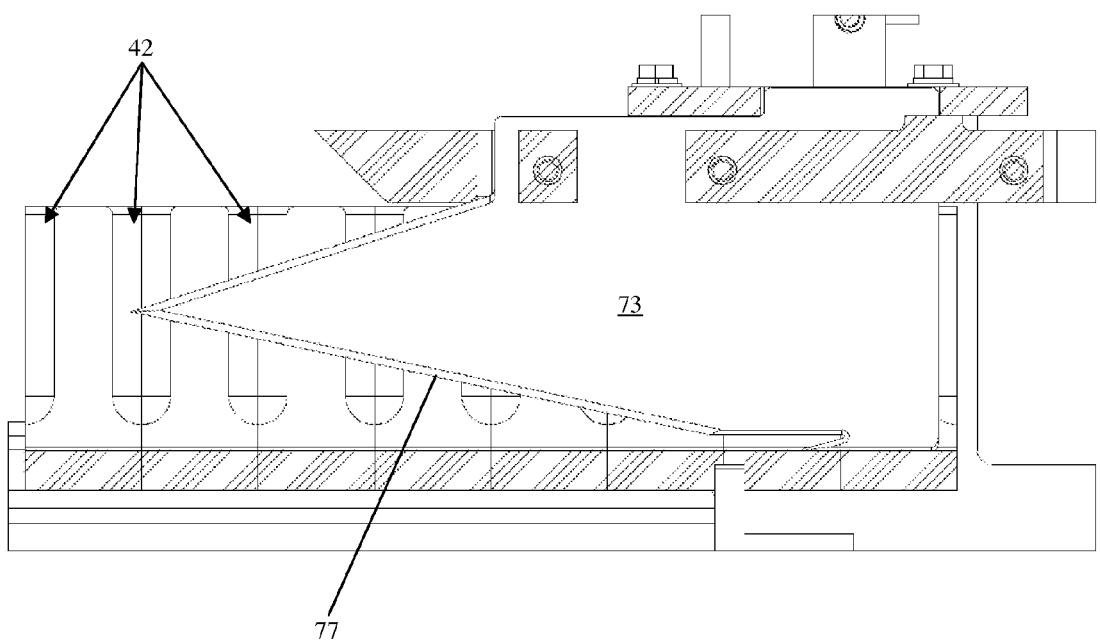
FIG. 12 is a detail side view in-section illustrating the alternative embodiment of the blade member shown in FIG. 11 in an operative position.

Referring to FIGS. 11 and 12, a blade member 73 is an alternative to the blade members 46 and 48 and two such blade members can be substituted for the blade members 46 and 48. As is apparent in FIG. 12, the blade member 73 has a broader upper blade 75 than the upper blade 56 of the blade members 46 and 48, with a bottom edge 77 that descends completely below the carrier slots 42. As will become apparent through comparison with the functional description of the blade members 46 and 48 below, the blade member 73 differs functionally from the blade members 46 and 48 in that the upper blade 75 completely splits a poultry mid-wing from a point of insertion of the tip 79 of the upper blade 75 into the mid-wing vertically outwardly, whereas the blade members 46 and 48 use their respective upper blades 56 to split the upper portions of mid-wings but rely on their respective crotches 60 to pinch and sever the lower ends of mid-wings.

Referring to FIG. 4, the blade members 46 and 48 preferably include integral mounting plates 74 and 76 that extend upwardly through rectangular apertures in the blade holder 50. Removable fasteners 78 and 80 extend laterally through the mounting plates 74 and 76 and through the mounting arms 82 and 84 that extend upwardly from the blade holder 50, thereby removably securing the blade members 46 and 48 to the blade holder 50. There are preferably multiple vertically-spaced apertures (not within view) formed in the mounting plates 74 and 76 for allowing the blade members 46 and 48 to be secured in a variety of vertical positions relative to the blade holder 50. If one or both of the blade members 46 and 48 becomes dull or damaged, the splitting module 16 can be conveniently removed from the apparatus 10 and the blade members 46 and 48 can be conveniently removed from the splitting module 16 for sharpening or replacement.

The description and depiction of the shape of the blade members 46 and 48 contained herein, while provided by way of example only, have been found to be particularly effective for the mid-wing splitting operation described below. It is contemplated, however, that numerous variations to the shape, position, and orientation of the blade members 46 and 48 can be incorporated without departing from the spirit of the invention, as will be understood by one skilled in the art. For example, it is contemplated that the blade members 46 and 48 can alternatively be circular, irregular, or can have a variety of other shapes. It is further contemplated that a moving blade, such as the blade of a circular saw or a reciprocating saw, can be substituted for one or both of the stationary blade members 46 and 48.

Figure 7:
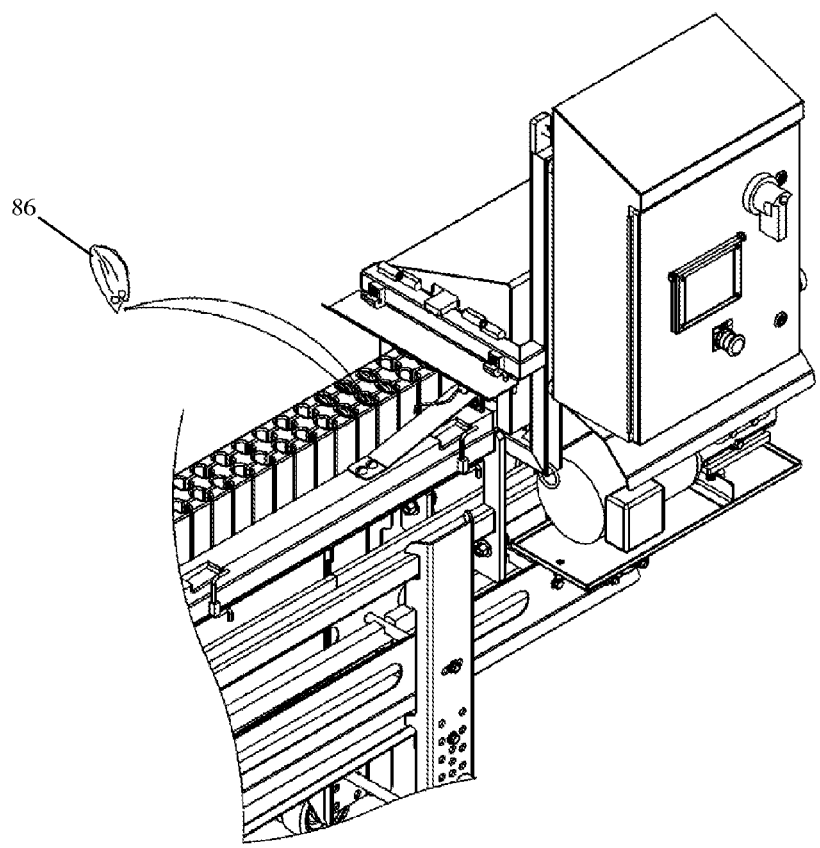
FIG. 7 is a detail perspective view illustrating the manner in which mid-wings are inserted into the carrier slots of the preferred embodiment of the present invention shown in FIG. 1.
Figure 8:
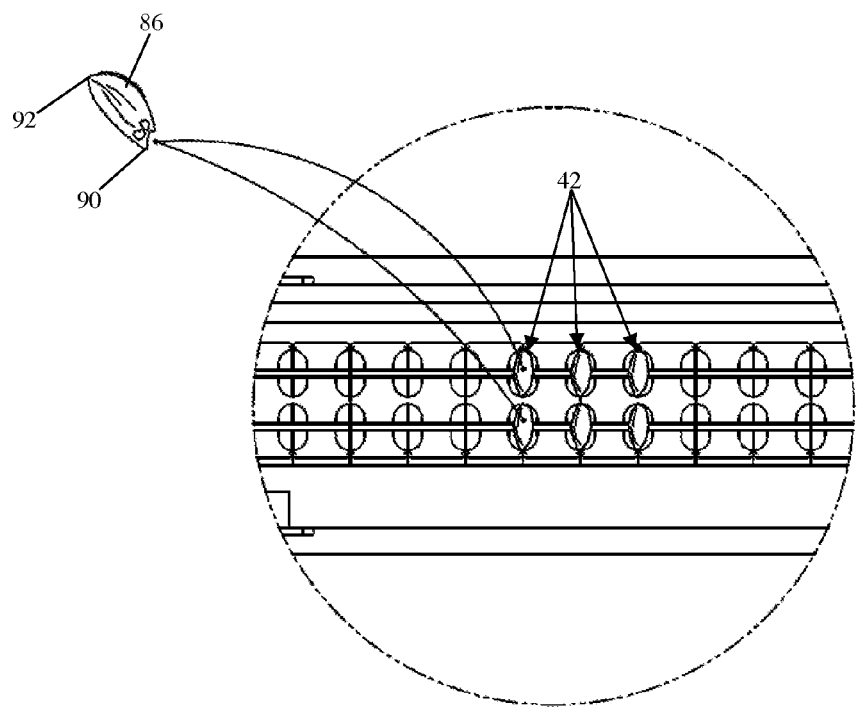
FIG. 8 is a detail top view illustrating the manner in which mid-wings are inserted into the carrier slots of the preferred embodiment of the present invention shown in FIG. 1.

Referring to FIGS. 7 and 8, during typical operation of the apparatus 10, one or more human operators insert whole poultry mid-wings, such as the mid-wings 86, into empty carrier slots 42 as the mid-wing carrier blocks 14 move in the downstream direction. The mid-wings 86 are inserted into the carrier slots 42 longitudinally, with the radius portion of a mid-wing 86 positioned substantially in one lateral half of a carrier slot 42 and the ulna portion of the mid-wing 86 positioned substantially in the opposing lateral half of the slot 42.

The mid-wings 86 can be inserted into the carrier slots 42 with either of their flat sides facing downstream and with either their larger, drumette ends 90 at the bottoms of their respective slots 42 or their smaller, wingtip ends 92 at the bottoms of their respective slots 42. For convenience of description, the mid-wings 86 are all shown and described herein with their drumette ends 90 at the bottoms of the carrier slots 42.

Figure 9:
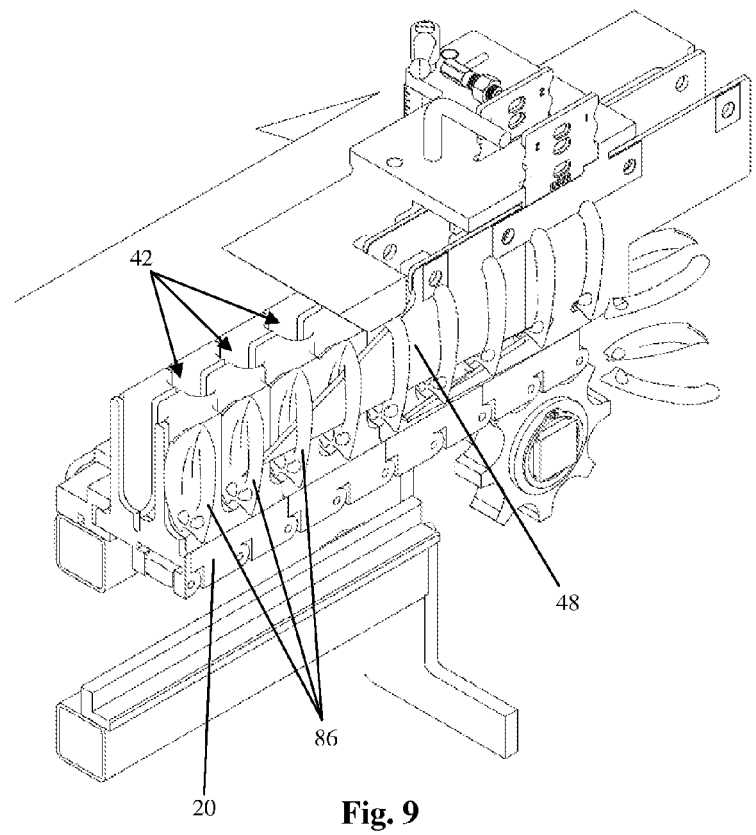
FIG. 9 is a detail perspective view in-section illustrating the splitting module and carrier blocks of the preferred embodiment of the present invention shown in FIG. 1 with mid-wings loaded into the carrier slots.
Figure 10:
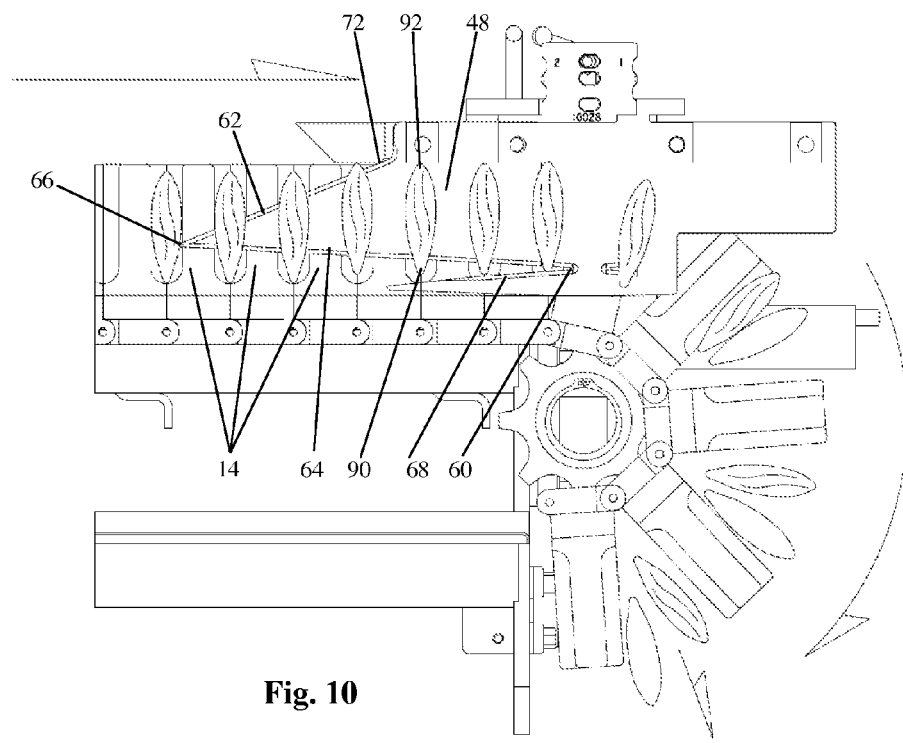
FIG. 10 is a detail side view in-section illustrating the splitting module and carrier blocks of the preferred embodiment of the present invention shown in FIG. 1 with mid-wings loaded into the carrier slots.

Referring now to FIGS. 9 and 10, the slotted mid-wings 86 are moved in the downstream direction by the drive chain 20. When a mid-wing 86 reaches the blade member 48, the piercing tip 66 of the upper blade 56 pierces the mid-wing 86 at a point laterally intermediate the radius and ulna bones of the mid-wing 86. As previously described, it is preferred that the piercing tip 66 be sharp enough to pierce the skin and the muscle of a mid-wing 86, but not sharp enough to significantly cut into or damage the bones of a mid-wing 86, given the amount of force provided by the drive chain 20, even if the tip 66 contacts a bone. Thus, if a mid-wing 86 is slightly misaligned within the carrier slot 42 resulting in the piercing tip 66 striking one of the radius or ulna bones of the mid-wing 86, the tip 66 will not pierce or nick the bone, but will instead force the bone to shift or slide laterally to the outer side of the upper blade 56 and thus allow the upper blade 56 to pass between the radius and ulna bones.

As a mid-wing 86 is driven further downstream onto the upper blade 56, the top and bottom cutting edges 62 and 64 of the upper blade 56 sever the soft tissue of the mid-wing 86 longitudinally outwardly from the point of entry of the piercing tip 66 toward the opposing wingtip and drumette ends 90 and 92 of the mid-wing 86. As the mid-wing 86 is forced over the upper blade 56, the upstream walls of the carrier slot 42 push the mid-wing 86 and prevent upstream movement of the mid-wing 86.

After the mid-wing 86 has been forced over the first several inches of the upper blade 56, the connective tissue at the crux of the wingtip end 92 of the mid-wing 86 is forced into the crotch 72 between the top edge 70 of the upper blade 56 and the blade holder 50. The connective tissue, skin, and muscle that connect the radius and ulna portions at the wingtip end 92 of the mid-wing 86 are then forcibly severed by the top edge 62 of the upper blade 56 as the carrier blocks 14 continue to drive the mid-wing 86 downstream beyond the crotch 72.

As the mid-wing 86 continues to be moved further downstream over the blade member 48, the connective tissue at the crux of the drumette end 90 of the mid-wing 86 is forced into the crotch 60 between the bottom edge 64 of the upper blade 56 and the top edge 66 of the lower blade 58. As with the wingtip end 92, the connective tissue, skin and muscle that connect the radius and ulna portions at the drumette end 90 of the mid-wing 86 are then forcibly severed by the upper and lower blade 56 and 58 as the carrier blocks 14 continue to drive the mid-wing 86 downstream beyond the crotch 60.

After or immediately before the radius and ulna portions of the mid-wings 86 have been completely severed from one another, the carrier blocks 14 that form the carrier slots 42 that hold the separated mid-wings 86 are rotated downwardly about the downstream end of the apparatus 10. As the carrier blocks 14 rotate downwardly, the blocks 14 are angularly separated from one another, as shown in FIG. 10. The carrier slots 42 are thereby opened and the separated radius and ulna portions of the mid-wings 86 are allowed to fall by gravity into a bin (not shown) below, where they can be collected for further processing.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for splitting whole poultry mid-wings into separate radius and ulna portions, the apparatus comprising:
   a. a plurality of abutting carrier blocks arranged in a series, each carrier block having at least one upstream-facing recess and at least one downstream-facing recess wherein recesses of adjacent, abutting carrier blocks cooperate to form at least one carrier slot between each pair of carrier blocks, each carrier slot being configured for securely holding at least one of the mid wings in a predetermined orientation;
   b. a blade channel is formed through each of the carrier blocks, thereby extending through each of the carrier slots;
   c. means for driving the carrier blocks along a path in a downstream direction; and
   d. a blade holder having at least one blade member mounted thereto, the blade member extending into the blade channels of said carrier blocks for engaging the mid-wing held within each carrier slot as the carrier slot is driven adjacent the blade member to separate the radius and ulna portions of the mid-wing from one another.

2. The apparatus in accordance with claim 1, wherein each carrier slot has a bottom wall and side walls extending from the bottom wall configured to inhibit upstream movement of the mid-wing inserted therein.

3. The apparatus in accordance with claim 1, wherein the upper blade is longer and extends further upstream than the lower blade.

4. The apparatus in accordance with claim 1, wherein the means for driving the carrier blocks along a path in a downstream direction comprises an endless conveyor to which the carrier blocks are mounted, the endless conveyor being driven by a prime mover, wherein the carrier blocks are rotated downward about a downstream end of the path, such downward rotation causing the carrier blocks to separate from one another, thereby causing said at least one carrier slot to be opened and the mid-wing contained therein to fall out of said at least one carrier slot by gravity.

5. The apparatus in accordance with claim 1, wherein said at least one carrier slot comprises two laterally-spaced carrier slots and wherein said at least one blade member comprises two laterally-spaced blade members.

6. The apparatus in accordance with claim 1, wherein said at least one blade member is adjustably mounted to the blade holder for allowing the vertical position of said at least one blade member to be adjusted relative to the blade holder.

7. The apparatus in accordance with claim 1, wherein the blade holder and said at least one blade member define a blade module that is removable from the apparatus as a single unit.

8. The apparatus in accordance with claim 1, wherein said at least one blade member comprises an upper blade having a top edge and a bottom edge that meet at a piercing tip and a lower blade having a top edge, wherein the top edge of the upper blade and the blade holder meet at a juncture that forms a first crotch for engaging and separating a first end of a mid-wing that engages the first crotch, and wherein the bottom edge of the upper blade and the top edge of the lower blade meet at a juncture that forms a second crotch for engaging and separating a second end of the mid-wing that engages the second crotch.

9. An apparatus for splitting whole poultry mid-wings into separate radius and ulna portions comprising, in combination:
   a. a plurality of abutting carrier blocks arranged in a series, wherein pairs of adjacent carrier blocks cooperatively form at least one carrier slot for securely holding a mid-wing in a predetermined orientation, and wherein said at least one carrier slot has a blade channel formed through it;
   b. means for driving the carrier blocks along a path in a downstream direction;
   c. a blade holder having at least one blade member mounted thereto, the blade member extending into the path and aligned with the blade channel of said at least one carrier slot for extending into the blade channel and engaging the mid-wing held within said at least one carrier slot as it is driven over the blade member to separate the radius and ulna portions of the mid-wing from one another; and
   d. wherein said at least one blade member comprises an upper blade having a top edge and a bottom edge that meet at a piercing tip and a lower blade having a top edge, wherein the top edge of the upper blade and the blade holder meet at a juncture that forms a first crotch for engaging and separating a first end of a mid-wing that engages the first crotch, and wherein the bottom edge of the upper blade and the top edge of the lower blade meet at a juncture that forms a second crotch for engaging and separating a second end of the mid-wing that engages the second crotch.

10. A method for splitting whole poultry mid-wings into separate radius and ulna portions comprising:
    a. conveying the mid-wings in carrier slots, each carrier slot defined by a recess in an upstream-facing portion and an adjacent recess in a downstream-facing portion of abutting carrier blocks, along a path in a downstream direction;
    b. directing the mid-wings into a blade that bisects the radius and ulna portions of the mid-wings while inhibiting upstream movement of the mid-wings; and
    c. rotating the carrier blocks downward about a downstream end of the path to pivot the carrier blocks relative to one another, thereby causing each adjacent and abutting upstream-facing portion and downstream-facing portion to open and the mid-wings contained therein to fall out of the carrier slots by gravity.

* * * * *